United States Patent
Lomagno et al.

(10) Patent No.: US 6,880,889 B2
(45) Date of Patent: Apr. 19, 2005

(54) HEADREST CUSHION ACTUATING DEVICE, PARTICULARLY FOR VEHICLE SEATS

(75) Inventors: Mauro Lomagno, Frossasco (IT); Luca Bronzino, Villar Focchiardo (IT)

(73) Assignee: Gestind S.p.A., Bruzolo (IT)

( * ) Notice: Subject to any disclaimer, the term of this patent is extended or adjusted under 35 U.S.C. 154(b) by 0 days.

(21) Appl. No.: 10/667,969

(22) Filed: Sep. 23, 2003

(65) Prior Publication Data

US 2004/0130191 A1 Jul. 8, 2004

(30) Foreign Application Priority Data

Sep. 24, 2002 (IT) .................................... TO2002A0837

(51) Int. Cl.$^7$ ................................................ A47C 1/10
(52) U.S. Cl. ........................ 297/408; 297/410; 297/391
(58) Field of Search ................................ 297/408, 391, 297/403, 410

(56) References Cited

U.S. PATENT DOCUMENTS

| | | | | |
|---|---|---|---|---|
| 4,778,218 A | * | 10/1988 | Suman ........................ 297/391 |
| 4,883,243 A | * | 11/1989 | Herndon .................. 244/122 R |
| 5,364,164 A | * | 11/1994 | Kuranami ................... 297/408 |
| 5,531,505 A | * | 7/1996 | Baetz et al. ................ 297/408 |
| 6,079,776 A | * | 6/2000 | Breitner et al. ......... 297/216.12 |
| 6,199,947 B1 | * | 3/2001 | Wiklund ................ 297/216.12 |
| 6,213,548 B1 | * | 4/2001 | Van Wynsberghe et al. ..... 297/216.12 |
| 6,220,668 B1 | * | 4/2001 | Scheffzuck .................. 297/391 |
| 6,467,846 B1 | * | 10/2002 | Clough ....................... 297/410 |
| 6,511,130 B1 | * | 1/2003 | Dinkel et al. ............... 297/410 |
| 6,513,871 B1 | * | 2/2003 | Bartels ................... 297/216.12 |
| 6,607,242 B1 | * | 8/2003 | Estrada et al. ......... 297/216.12 |
| 6,612,653 B1 | * | 9/2003 | Takata ......................... 297/408 |

FOREIGN PATENT DOCUMENTS

| | | |
|---|---|---|
| DE | 3900495 | 7/1990 |
| DE | 10033913 | 1/2002 |
| EP | 0974484 | 1/2000 |
| EP | 1046550 | 10/2000 |
| EP | 1193114 | 4/2002 |
| GB | 2363323 | 12/2001 |

* cited by examiner

Primary Examiner—Peter M. Cuomo
Assistant Examiner—Erika Garrett
(74) Attorney, Agent, or Firm—Shlesinger, Arkwright & Garvey LLP

(57) ABSTRACT

A cushion body of a headrest is fitted to a vehicle seat by two supporting rods, and, in the event of impact of the vehicle, is movable with respect to the supporting rods by an actuating device, wherein an actuating assembly, acting on the cushion body, is connected to a rear plate of a frame housed inside the cushion body and in turn connected releasably to the supporting rods; the actuating assembly having a front plate movable with respect to the rear plate and connectable to a portion of the cushion body.

15 Claims, 2 Drawing Sheets

HEADREST CUSHION ACTUATING DEVICE, PARTICULARLY FOR VEHICLE SEATS

The present invention relates to a headrest cushion actuating device, particularly for vehicle seats.

More specifically, the present invention relates to an "active" headrest, i.e. equipped with an actuating device designed, in the event of impact, to move the cushion body towards the user's head to prevent so-called "whiplash".

BACKGROUND OF THE INVENTION

Known actuating devices, most of which are pyrotechnic, act directly on the cushion body, and are supported by a tubular frame inside the cushion body itself.

The frame is formed in one piece, with the supporting rods projecting from the cushion body to connect the headrest to the seatback, and comprises a curved rod portion, normally formed by welding a number of tubular parts, each shaped to attach the specific actuating device employed.

While enabling the manufacture of lightweight headrests, the tubular frame is complicated and time-consuming to produce, and designed for a specific type of headrest and cushion body. This is mainly due to the supporting rods forming an extension of the frame inside the cushion body, and therefore an integral part of a single monolithic frame of a given type of headrest.

Moreover, the geometry of the cushion body and the way in which it is connected to the actuating device are determined by the characteristics and size of the actuating device, which means connection of the cushion body to the actuating device is often complicated and awkward, especially on account of the actuating device having to be connected to an inner surface of the cushion body.

SUMMARY OF THE INVENTION

It is an object of the present invention to provide a headrest cushion actuating device, particularly for vehicle seats, designed to provide a straightforward, low-cost solution to the above problems.

According to the present invention, there is provided an actuating device for a cushion body of a headrest, particularly for vehicle seats, comprising two connecting rods projecting from the cushion body; the actuating device comprising a supporting frame housed inside the cushion body, and actuating means carried by the supporting frame and fitted to the cushion body to adjust the position of the cushion body with respect to the rods; said supporting frame comprising a first platelike portion supporting connecting means for said actuating means; said actuating-means comprising a second substantially platelike portion movable with respect to said first platelike portion and supporting at least part of said cushion body; and connecting means being provided to connect said rods to said first platelike portion.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
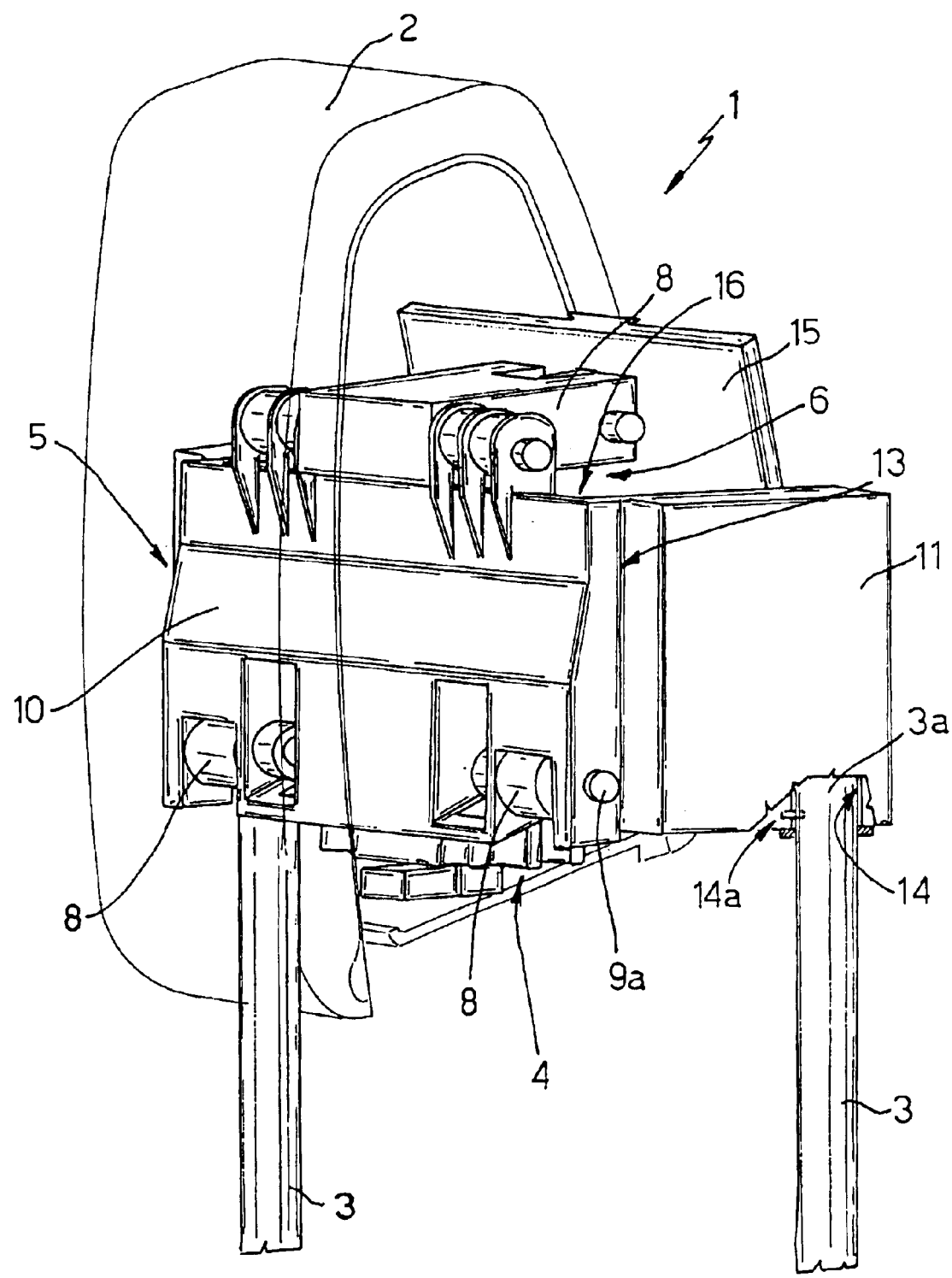
FIGS. 1 and 2 show two different views in perspective of a preferred embodiment of the actuating device according to the teachings of the present invention.
Figure 2:
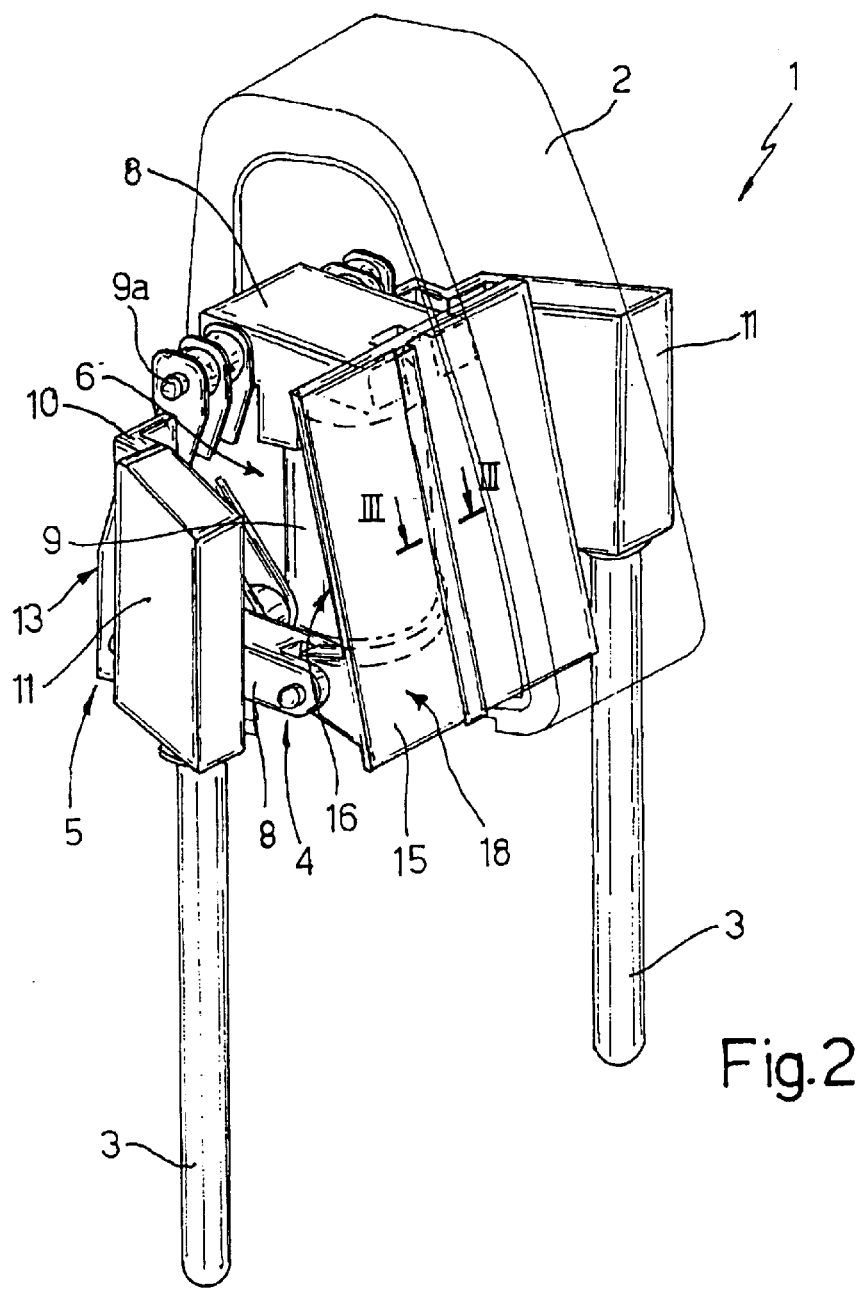
Figure 3:
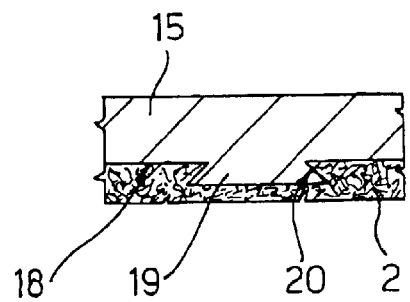
FIG. 3 shows a section along line III—III in FIG. 2.

Number 1 in FIGS. 1 and 2 indicates as a whole an "active" headrest for a vehicle seat. Headrest 1 comprises a cushion body 2 (shown partly); two supporting rods 3 projecting from cushion body 2 to connect cushion body 2 to a seat (not shown); and an actuating device 4 housed inside cushion body 2 to adjust the position of cushion body 2 with respect to rods 3 in the event of impact of the vehicle.

Device 4 is a pyrotechnic type, and comprises a supporting frame 5, and an actuating assembly 6 in turn comprising, in the example described, a number of levers 8 hinged to frame 5 at one end, and connected to cushion body 2 at the other end, and a pyrotechnic actuator 9 (FIG. 2) connected, in known manner not described in detail, to frame 5 and levers 8 to rotate levers 8, in use, with respect to frame 5.

In the example described, frame 5 comprises a rigid, substantially flat rear plate 10, to which levers 8 are hinged by respective pins 9a; and two shoulders 11 located, facing each other, on opposite lateral sides of rear plate 10, and each defined by a rigid flat plate defining a lateral stop on which cushion body 2 rests in use. Each shoulder 11 is connected integrally to rear plate 10, extends fronwards from rear plate 10, and, in the example shown, forms part of a rigid, substantially U-shaped, monolithic body 13 formed in one piece of metal or plastic material, and of which rear plate 10 forms an intermediate portion. In a variation not shown, shoulders 11 are separate from rear plate 10 and connected to rear plate 10 by screws or other fast-fit fastening devices. In such a solution, both the rear plate and shoulders can be selected from a number of rear plates and shoulders of different shapes and sizes, each designed for a given actuating device or given cushion body, thus enabling headrests to be configured according to construction requirements, i.e. the type of vehicle to which they are to be fitted.

Still with reference to FIGS. 1 and 2, each shoulder 11 has a substantially vertical dead hole 14 (FIG. 1) extending from a bottom surface of shoulder 11 facing the seat in use, and for receiving a connecting end portion 3a of a relative rod 3. Each connecting end portion 3a is retained inside the relative hole by a respective known retaining device 14a shown schematically, and which is either a click-on type or comprises a pin fitted through rod 3 and at least part of shoulder 11.

Again with reference to FIGS. 1 and 2, the end portions of levers 8 opposite those hinged to rear plate 10 are hinged to a movable front plate 15 located on the opposite side of levers 8 and pyrotechnic actuator 9 to rear plate 10, and forming part of actuating assembly 6. Front plate 15 defines, together with rear plate 10 and shoulders 11, a cavity 16 for completely housing levers 8 and pyrotechnic actuator 9, and is fitted integrally, on an outer surface 18 facing inwards of cushion body 2 in use, with an elongated, conveniently dove-tailed projection 19, which slides axially inside a complementary slot 20 formed on an inner surface of cushion body 2 to define, in use, a releasable bayonet joint. In a variation not shown, projection 19 is carried by cushion body 2, and slot 20 by front plate 15. In a further variation not shown, the front plate or the cushion body carries two or more similar or different projections 19.

At assembly, selection of the actuating assembly 6 to be used automatically determines the type of rear plate 10, to which are connected rods 3, which can also be selected from a number of different rods having in common only the same connecting portions 3a engaging holes 14. At this point, the actuating device can be inserted inside a cushion body 2, which is also selectable from a number of cushion bodies, all having identical slots 20, into which projection 19 is simply slid at assembly to form a bayonet joint.

The design of actuating device 4, and specifically provision of rear plate 10 and front plate 15, therefore provide for obtaining a modular headrest, the various component parts of which can be selected from a number of component parts to form even widely differing headrests in terms of both appearance and function. The plates provide for completely housing the relatively-moving component parts of assembly 6, with absolutely no possibility of their coming into contact with the inner parts of cushion body 2. Moreover, front plate 15 provides, in particular, for releasing cushion body 2 from connection to actuating device 4, defines an ample supporting portion for the corresponding portion of cushion body 2, and, above all, provides for assembling cushion body 2 by means of one straightforward slide-on operation.

Plates 10 and 15, together with shoulders 11, also provide for obtaining a device 4 with a high degree of both flexural and torsional rigidity, and of a weight comparable with that of known solutions. Plates 10 and 15, in fact, enable the use of different materials from those of conventional dedicated tubular frames.

Clearly, changes may be made to headrest 1 as described herein without, however, departing from the scope of the present invention. In particular, plates 10 and 15 may be shaped differently from those shown, and may be provided with openings and/or ribs/bends to further reduce weight and increase rigidity.

Different devices may be provided to connect rods 3 to frame 5. In particular, articulated or hinged devices may be provided between rods 3 and frame 5 to adjust the position of rear plate 10 with respect to rods 3. And the rods may be joined by a cross member and form part of a continuous tubular body.

Fast-fit or other fastening devices differing from the one shown by way of example may be provided between front plate 15 and cushion body 2.

Finally, provision may be made, between plates 10 and 15, for an actuating assembly differing entirely from the one described and illustrated by way of example, e.g. an assembly enabling the user to adjust the position of the cushion body with respect to the rods according to personal comfort and/or safety requirements. Obviously, the actuating assembly provided may be such as to meet various requirements simultaneously.

What is claimed is:

1. An actuating device for a cushion body of a headrest for veicle seats, comprising two connecting rods projecting from the cushion body, the actuating device comprising:

a supporting frame housed inside the cushion body and operably secured to the connecting rods, and actuating means carried by the supporting frame and fitted to the cushion body;

said supporting frame comprising a first substantially plate-shaped member supporting said actuating means;

said actuating means comprising a second substantially plate-shaped member movable with respect to said first plate-shaped member and supporting at least part of said cushion body;

said actuating means further comprising levers connecting said first plate-shaped member to said second plate-shaped member; and said actuating means further comprising an actuator operably coupled to said first plate-shaped member and said levers to rotate said second plate-shaped member towards a user's head in the event of impact of the vehicle.

2. A device as claimed in claim 1, wherein said second plate-shaped member is separate from said cushion body, and carries a fastener for said cushion body.

3. A device as claimed in claim 2, wherein said fastener for said cushion body is a fast-fit fastener.

4. A device as claimed in claim 3, wherein said fast-fit fastener comprise bayonet connecting means.

5. A device as claimed in claim 3, wherein said fast-fit fastener comprises a projection carried by said second plate-shaped member; and a seat for housing said projection being carried by said cushion body.

6. A device as claimed in claim 1, wherein said rods are separate from said supporting frame.

7. An actuating device as claimed in claim 6, wherein said supporting frame also comprises two shoulders located on opposite lateral sides of said first plate-shaped member;

each of said shoulders carries, for each of said rods, a retaining seat engageable by a connecting portion of the connecting rod; and retaining means associated with said retaining seat to retain said connecting portion inside said retaining seat.

8. An actuating device as claimed in claim 7, wherein said shoulders have respective holes defining said retaining seats.

9. A device as claimed in claim 1, wherein said supporting frame also comprises two shoulders located on opposite lateral sides of said first plate-shaped member, and each defining a lateral support for said cushion body.

10. A device as claimed in claim 9, wherein each said shoulder is defined by a plate connected to said first plate-shaped member.

11. A device as claimed in claim 9, wherein said first plate-shaped member and said shoulders form part of a single monolithic, substantially U-shaped body.

12. An actuating device as claimed in claim 1, wherein said actuator is a pyrotechnic actuator.

13. An actuating device for a cushion body of a headrest for vehicle seats, comprising two connecting rods projecting from the cushion body, the actuating device comprising:

a supporting frame housed inside the cushion body and operably secured to the connecting rods, and actuating means carried by the supporting frame and fitted to the cushion;

said supporting frame defining a cavity;

said actuating means comprising a substantially plate-shaped member movable with respect to said supporting frame and supporting at least part of said cushion body;

said actuating means further comprising levers connecting said supporting frame to said plate-shaped member;

said actuating means further comprising an actuator to move said plate-shaped member towards a user's head in the event of impact of the vehicle; and said levers and said actuator are housed within said cavity.

14. An actuating device as claimed in claim 13, wherein:

said supporting frame comprises another substantially plate-shaped member; and;

two shoulders located on opposite lateral sides of said another plate-shaped member to form said cavity.

15. An actuating device as claimed in claim 13, wherein said shoulders are integral with said another plate-shaped member.

* * * * *